No. 708,020. Patented Sept. 2, 1902.
I. D. CADY.
VEHICLE SHAFT SUPPORT.
(Application filed Dec. 16, 1901.)
(No Model.)
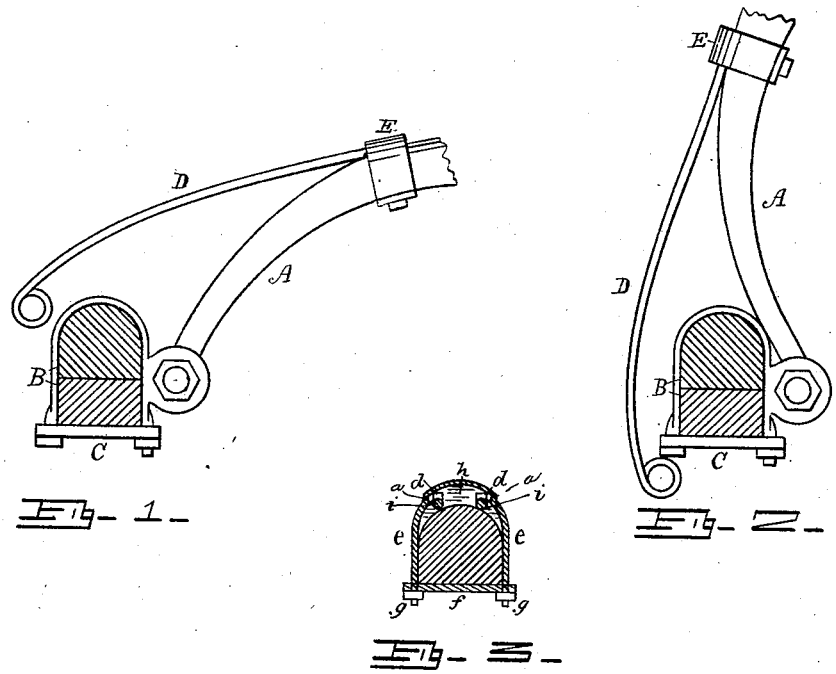
WITNESSES
Vernal Truesdell.
H. Thornton
INVENTOR
Ira D. Cady
By J. W. Powers
Atty
THE NORRIS PETERS CO., PHOTO-LITHO., WASHINGTON, D. C.

UNITED STATES PATENT OFFICE.

IRA D. CADY, OF MINNEAPOLIS, MINNESOTA.

VEHICLE-SHAFT SUPPORT.

SPECIFICATION forming part of Letters Patent No. 708,020, dated September 2, 1902.

Application filed December 16, 1901. Serial No. 86,012. (No model.)

*To all whom it may concern:*

Be it known that I, IRA D. CADY, a citizen of the United States, residing at Minneapolis, in the county of Hennepin and State of Minnesota, have invented a new and useful Improvement in Vehicle-Shaft Supporters, of which the following is a specification, reference being had to the accompanying drawings.

My invention has for its object the production of simple and efficient means for holding the shafts of vehicles in an upright position when not in use; and it consists in affixing elastic supports to the upper side of the shafts near their rear ends, which elastic supports when the vehicle is in use will remain free or out of contact with the axle, but when the vehicle is not in use and the shafts thereof are raised to an upright position the rear ends of the said elastic supports will interlock with the axle-clips, thereby supporting the shafts in their then upright position.

I am aware of the fact that similar devices have been invented for the purpose specified; but my device possesses certain novel features which gives it advantage over others, among which are, first, simplicity, it being fashioned in one piece; second, adaptability, it being adapted to attachment to all vehicles without the removal of the clips or other parts; third, freedom from contact with the axle or clip, thereby avoiding rubbing and consequent wear; fourth, adaptability, it being fashioned to provide for longitudinal adjustment, and, fifth, efficiency, being so fashioned as to lock the shafts securely in an upright position, yet adapted to release them without danger of breakage.

In the accompanying drawings, Figure 1 is a side elevation of a vehicle-shaft equipped with one of my supporters and a cross-section of the axle, the shafts being in a horizontal position, as when in use; Fig. 2, the same, the shafts being in a vertical position, as when not in use; Fig. 3, a cross-section of shaft and clamping device; and Figs. 4, 5, 6, and 7 views of my supporter at different stages of its construction.

Similar letters refer to similar parts, A being the shaft of a carriage; B, the axle thereof; C, the clip coupling the said shaft to the said axle; D, the shaft-supporter, and E the clamp securing the shaft-supporter to the shaft. The shaft A, axle B, and clip C are not unlike those commonly used, hence need no description herein.

The supporter consists of a single piece of spring-wire fashioned in the following manner: I select suitable wire (hard steel being best adapted to the purpose) and cut it into the required length, (about twelve inches long,) thus forming the blank bars, as shown in Fig. 4, which I now bend at a point midway between their opposite ends, thus forming the elongated U-shaped loop shown in Fig. 5, having two parallel bars $a$ of equal length connected at one end by the semicircular portion $b$. I next bend the connected ends of the parallel bars $a$ (the portion $b$) laterally and form the coil $c$. (Shown in Fig. 6.) I next bend the free ends of the parallel bars $a$ laterally in an opposite direction to the coil $c$, thereby forming the lugs $d$, and complete my supporter by bending the parallel bars $a$ intermediate their length, so as to leave the coil $c$ on the concave and the lugs $d$ on the convex sides thereof. The clamp E consists of an inverted-U-shaped clamp $e$, adapted to overlap the shaft A, a laterally-pierced clamping-bar $f$, adapted to receive the downwardly-extending "threaded" ends of the clamp $e$, and the threaded nuts $g$, adapted to receive the threaded ends of the clamp $e$, which extends below the clamping-bar $f$, and to secure the said clamp and bar to the shaft A. The under side of the upper portion of the clamp $e$ is fashioned with a longitudinal slot or recess $h$, adapted to receive the upwardly-extending lugs $d$ of the supporter D, and with two transverse grooves $i$, adapted to receive the portions of the parallel bars $a$ adjacent to the said lugs $d$. This clamping device while holding the supporter D rigidly upon the shaft A provides for adjustment of the former, the clamp $e$ being longitudinally movable upon the shaft A.

The operation of my shaft-supporter is as follows: When the vehicle is in use and the shafts are in a horizontal position, the rearwardly-extending and downwardly-curved supporter D is free from contact with the carriage-axle B or any attachment thereof. Hence there is no rubbing of parts; but when the vehicle is not in use, and it is desirable to have the shafts supported off the floor, I raise them to a vertical position, when the supporter D will pass downward and to the rear of the axle B, its coiled loop will underlap the rear portion of the clip C, and thereby support the shafts A in their then vertical position. While the tension of the supporter D is sufficient to hold the shafts securely in a vertical position, it is not so great that it prevents the shafts from being lowered to a horizontal position when required.

Having thus described my invention, what I claim as new, and desire to secure by Letters Patent, is—

A device of the type set forth comprising in combination with the axle and the shafts, a clamp adjustably mounted upon the shafts, and a supporter formed of an integral piece of wire bent into a U shape, the free ends of the wire being bent upwardly and immovably secured in the clamp, and a single coil formed on the looped portion of the supporter, the rear portion of the supporter being bowed and the coil frictionally engaging the under side of the axle for securing the shaft, substantially as described.

IRA D. CADY.

Witnesses:
VERNAL TRUESDELL,
W. G. THORNTON.